V. SQUARZA.
Measuring Faucet and Indicator.
No. 41,330. 
Patented Jan. 19, 1864.
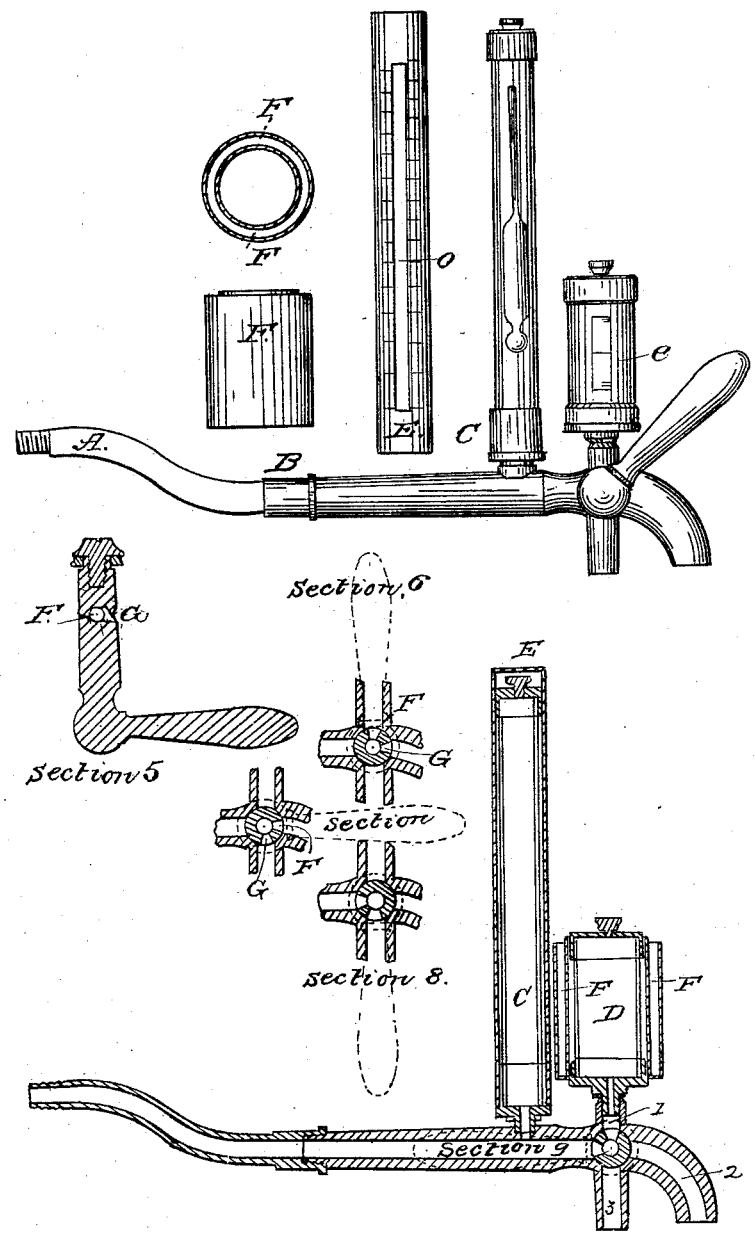

United States Patent Office.

VINCENT SQUARZA, OF SAN FRANCISCO, CALIFORNIA.

IMPROVEMENT IN FAUCET-MEASURES AND INDICATORS.

Specification forming part of Letters Patent No. 41,330, dated January 19, 1864.

*To all whom it may concern:*

Be it known that I, VINCENT SQUARZA, of the city and county of San Francisco, and State of California, have invented a new and useful Improvement for Faucets; and I do hereby declare that the following is a full, clear, and exact description of the construction and operation of the same, reference being had to the annexed drawing, making a part of this specification.

A represents the part of the faucet to be inserted in the barrel or other vessel, and has a downward curve, as represented in the drawings.

C is a tube of glass attached to the faucet, as shown in the drawing, and should extend thence to the top of the vessel.

E is a cylinder of brass or other suitable material, having several longitudinal openings O, each with its appropriate scale, so as to indicate the quantities in or taken from various-sized vessels. This cylindrical, revolving scale E fits over the tube C, and indicates the quantity in or taken from the vessel.

D is a measure provided with a scale, *e*, to indicate the quantity therein. The measure may be made of glass or of metal, and have a glass scale inserted therein.

F F is a jacket around the measure D, which I term a "regulator," wherein may be deposited material for regulating the temperature of the liquid within the measure. Said regulator is movable or transferable at pleasure. The faucet is provided with three exits, marked 1, 2, 3, all controlled by one cut-off.

The objects and working of my invention are as follows, viz: First, combining with the common faucet an indicator, showing the quantity contained in or taken from a given vessel; second, providing a measure, which may be used upon a faucet, either with or without the indicator; third, using the tube C of said indicator as a permanent or temporary receptacle for a hydrometer; fourth, the regulator F, for the purpose of regulating the temperature of the liquid as drawn from the vessel.

The combined faucet, indicator, and measure being attached to the vessel containing the liquid, the cylinder E is revolved upon the tube C till the proper scale is brought to the front. The figures, reading from top to bottom, on one side of the longitudinal opening O, will indicate the quantity taken from the vessel, while the figures on the opposite side of the opening will indicate the quantity contained in the vessel. The latter figures will read from bottom to top.

The level of the liquid in the glass-tube C will always correspond with that of the vessel, and can always be seen through the longitudinal opening O in the cylinder E.

When the measure is to be used, the handle of the faucet is turned, as shown by the dotted lines in section 9, so as to allow the liquid to enter the measure D. When the desired quantity has entered, the handle is turned, as shown in section 6, which allows the liquid to flow from the measure through the exit No. 2.

When it is desired to draw from the vessel without using the measure, the handle is turned as shown in section 8. When it is desired to close the faucet so that the liquid shall not flow at all from the vessel, the handle should be turned as shown in section 7.

When it is desired to regulate the temperature of the liquid in the measure D, the regulator F should be attached thereto, and filled with ice, hot water, or other suitable material.

The downward curve of the faucet from A to B allows the indicator and measure to operate at the lowest level of the contents of the vessel.

Having thus described my invention and its operation, I claim—

1. The application to faucets of the gage-tube E, provided with a double scale to indicate both the quantity remaining in the vessel as well as the quantity drawn therefrom, substantially in the manner herein described.

2. The measure D, in combination with the three-way faucet, substantially in the manner and for the purposes herein described.

3. In combination with the measure D of a measuring-faucet, the regulator F, for regulating the temperature of the liquid to be drawn, substantially in the manner herein described.

VINCENT SQUARZA.

Witnesses:
HENRY BERWIN,
SAMUEL H. HENRY.